United States Patent [19]
Unger

[11] 3,812,819
[45] May 28, 1974

[54] INDICATOR DEVICE FOR SPORT EQUIPMENT

[76] Inventor: Paul Sebastian Unger, Bruckwiesenstrasse 113, 8501 Altenberg near Nurnberg, Germany

[22] Filed: Feb. 9, 1972

[21] Appl. No.: 224,908

[30] Foreign Application Priority Data
Feb. 16, 1971  Germany............................ 2107252

[52] U.S. Cl............................... 116/135, 280/11.35
[51] Int. Cl............................................... G09f 9/00
[58] Field of Search................... 116/135; 280/11.35

[56] References Cited
UNITED STATES PATENTS
| | | | |
|---|---|---|---|
| 3,337,225 | 8/1967 | Smolka et al. | 280/11.35 |
| 3,351,354 | 11/1967 | Smolka et al. | 280/11.35 |
| 3,489,122 | 1/1970 | Schweizer et al. | 116/135 |

Primary Examiner—Louis J. Capozi
Attorney, Agent, or Firm—Robert H. Jacob

[57] ABSTRACT

Indicating device for sport equipments that operate against the effect of an adjustable spring or for associated equipments which measure the force of the spring, comprising an indicator coupled with the spring adjusting means which participates in the movement of the adjusting means the position of which can be read on a scale, the indicating device which includes first and second retaining means for supporting the spring at opposite ends has spring adjusting means at one end of the spring which supports the indicator, scale means extending adjacent the first retaining means, the indicator and the spring adjusting means, the scale setting means being operable to displace the scale means in the direction of adjustment of the spring, while the adjusting means and spring setting means each include an adjusting screw that is accessible from the exterior of the housing and stop abutments are disposed at opposite ends of the scale means for limiting the extreme adjustable positions of the spring.

8 Claims, 4 Drawing Figures

INDICATOR DEVICE FOR SPORT EQUIPMENT

BACKGROUND OF THE INVENTION

The invention relates to indicating or measuring means for spring forces. More in particular the invention concerns an indicator device for sport equipment operating against the effect of an adjustable spring, or for associated devices that measure spring forces, where an indicator is provided that is coupled to the spring adjusting means and follows the adjustments, the existing position of which can be read on a scale or the like that is provided on the equipment.

For this purpose a maximum indicator is already known that is moved by a spring. Indicators are also known that are supported by the setting spring and indicate the instant setting of the force of the spring on a scale that is fixed to the equipment or to the housing. This may be a set screw mounted on the equipment, which by means of a nut or the like compresses the spring of the equipment more or less strongly while the position of this nut or the like relative to the set screw is indicated.

It is an object of the invention to further develop and improve such an indicating device in accordance with the advantages set forth in detail hereinafter.

SUMMARY OF THE INVENTION

In accordance with the invention it is therefore proposed to provide a scale part provided with this scale or an additional scale which is adjustable or displaceable in the setting direction of the spring relative to the equipment and fixed in the instant setting position, that the setting or adjusting means of the equipment when ready for use can be serviced from the outside, and that for limiting the two extreme adjustment positions of the spring a stopping abutment is provided that is adjustable in the direction of adjustment. With this it is possible to take into account all setting possibilities and requirements that can arise with such a sport equipment, for example a front jaw or a heel retainer of a ski binding, an expander or the like.

This adjustment or displacement of the scale relative to the equipment makes it possible with equipment that is ready for operation to compensate for inaccuracies and errors from the outside which result from manufacture, or the spring material used and/or fatigue of the spring, that develop during use. Thus, not only work shop adjustment is provided for that cannot be effected later when the equipment is in use, or only by cumbersome dismantling of the equipment, but adjustment of the indicator means with respect to the spring force that is actually present in the equipment is possible. The stopping abutments secure the two extreme setting positions of the spring. The force of the spring thus can neither be set below a minimum value it determines nor above a maximum value. This is particularly important in those cases where the minimun and maximum values are established by rules, directions or recommendations, such as, for example, the minimum or maximum value of the release force of a component of a ski binding. Furthermore, the stopping abutments can be adjusted in the setting direction. This is possible either in a manner that the stopping abutments are fixed to the scale part and when it is displaced, they are displaced with it. Instead, it is possible in accordance with a further feature in accordance with the invention to adjust also each stopping abutment per se relative to the scale and thereby also relative to the housing. These adjusting possibilities permit of enlarging, decreasing and/or displacing of the existing adjustment range. The adjustments can also be made from the exterior.

BRIEF DESCRIPTION OF THE DRAWINGS

Further features and advantages of the invention will beome apparent from the following specification with reference to the embodiments illustrated in the accompanying drawings, in which.

DESCRIPTION OF THE INVENTION

The invention is illustrated in the embodiments in connection with a front jaw for ski bindings. However, it could also be employed with other sporting goods with a spring the force of which is adjustable and an indicating means of this type, for example, expanders, home training equipment, in measuring devices for adjusting such spring forces and the like.

Figure 1:
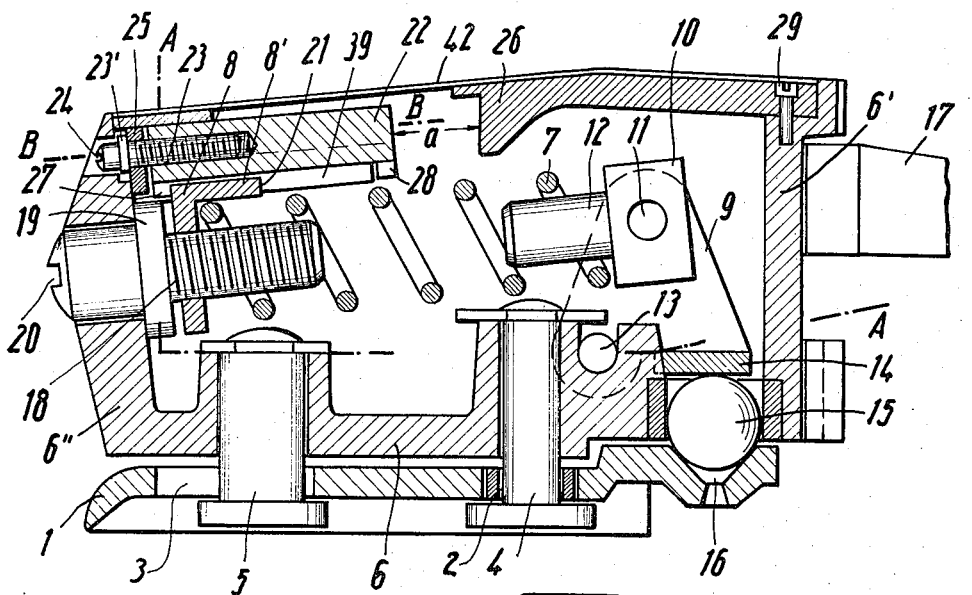
FIG. 1 is a longitudinal section of one embodiment of the invention.
Figure 2:
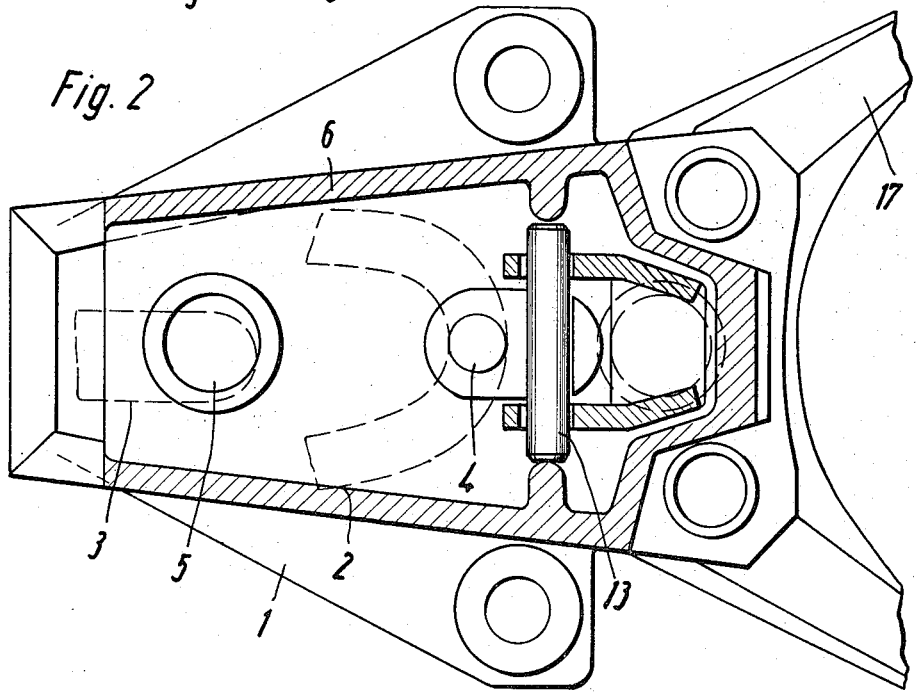
FIG. 2 is a horizontal section taken along A—A in FIG. 1.

According to FIGS. 1 and 2 a base element 1 is provided that has a U-shaped guide member 2 for a bolt 4 and a guide slot 3 for a pin 5. The compression spring 7 is located in housing 6, and is at one end supported against a threaded collar 8 to be described more in detail, and at its other end it is biased against block 10 supported on angular member 9. The angular member supports bias block 10 by way of shaft 11, and block 10 has a stud 12 of reduced diameter that is received in the proximate end of the spring. Furthermore, the angular member 9 is pivotally journalled in the housing as at 13 and, under the pressure of spring 7, presses a stop ball 15 into a recess 16 in the base 1. In this manner which is generally horizontally disposed is converted to a the force of the spring generally vertically downward direction against stop 15, 16. This provides the advantage that the spring may be relatively long, and therefore its constant of resiliency may be correspondingly small. A sole retaining member 17 is provided on the housing which engages the front edge of the ski boot from the top and from the sides. If the ski boot exerts too strong a pressure that is directed to the side on the sole retaining member 17 and thereby on the housing, the ball 15 moves from the recess 16 and the bolt 4 moves to the side in the guide slot 2. Simultaneously pin 5 slides forward in the slot 3. That is the torsion release.

Figure 3:
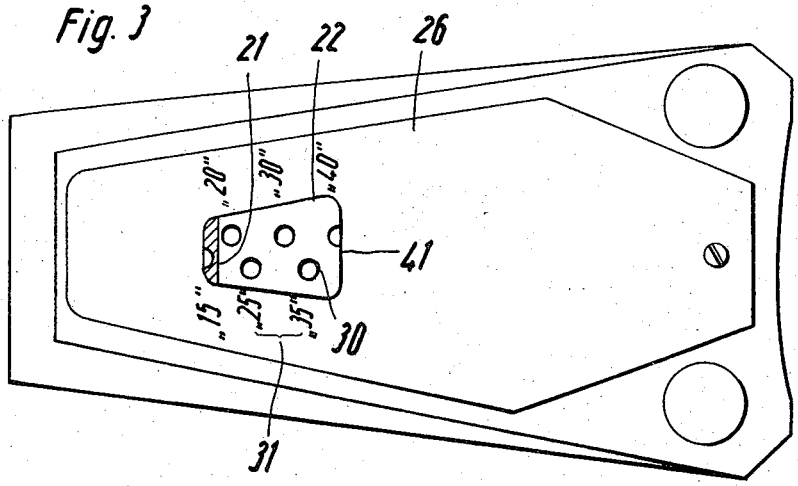
FIG. 3 is a partial top view of FIG. 1.

Spring 7 presses the flange 19 of set screw 18 against the front end 6'' of the housing. The screw can be turned by means of slot 20 which is accessible from the outside. The threaded collar 8 engages with its inner thread the outer thread of screw 18 and is secured against turning by slide guides 39 as the screw 18 is turned. As the screw 18 is turned, the threaded collar 8 moves to the left or to the right as seen in the drawing, whereby the spring 7 is tightened or loosened. The threaded collar 8 has an angular offset 8'. This offset terminates in an indicating edge 21, which is visible through a transparent member 22 provided with markings (see also FIG. 3) and defining a scale. The surface of the offset 8' facing the window may be provided with conspicuous coloring in order to facilitate discerning. The construction of the scale part as a transparent member 22 provides the advantage that, while having a reading that can be very well seen, the interior of the housing is well protected against penetration of foreign matter, such as ice and snow. The transparent member 22 can be held and guided by means of lateral guides 32 in the nature of grooves in the housing, preferably its cover 26.

The transparent member 22 located below housing aperture 42 is adjustable relative to the housing in the direction of adjustment of spring 7 and this in accordance with the embodiment by means of screw 23 positioned in the wall of the housing which engages a thread in the transparent member 22. Also this screw is rotatable and secured on the housing against longitudinal displacement. A retaining sheet metal plate 25 which is disposed between the cover 26 and the front housing wall 6'' can serve for this purpose (see also FIG. 5), so that a collar 23' of screw 23 is retained between the sheet metal plate and the housing wall 6''. The setting slot of the screw is accessible from the outside.

The magnitude of the adjusting range a can be selected as desired. The length of the threaded shaft of the screw 23 will correspond thereto somewhat, but will preferably be somewhat greater. Since this screw may be as long as the transparent member 22 a very large range of adjustments is made available.

The stop abutments 27, 28 for limiting the adjustment position of spring 7 may be on the transparent member 22 in accordance with this embodiment. As viewed in the direction of setting they are provided at the front and the rear end of the scale part. The threaded collar 8 with its offset 8' is disposed between them. Thus the stop abutment 27 constitutes the limit for the setting of the spring for the smallest permissible force and the abutment 28 the limit for the setting of the spring for the greatest permissible force. In this embodiment the stop abutments 27, 28 are fixed to the transparent member 22. Thus by turning the adjusting screw 23 they are displaced as the screw 23 is rotated for the longitudinal adjustment of the scale part, whereby a suitable displacement of the entire adjustment range upwardly or downwardly is obtained.

It is also within the scope of the invention to adjust one or both stop abutments independently. For this both stop abutments may be on the scale part (see embodiment of FIGS. 4 and 5). Instead, it is also possible to arrange the adjustable stop abutments in the wall of the housing. For the sake of simplification one of these abutments in the form of an adjustable setting screw 43 has been drawn schematically and in dash and dot lines in the embodiment of FIG. 5 which itself contains the possibility of an embodiment having two stop abutments that are adjustable relative to the scale part.

Finally, it is also possible to provide a stop abutment on the scale part and an adjustable stop abutment in the wall of the housing. In each of the embodiments, the stop abutments are adjustable in the direction of the spring adjustment. While in the embodiments of FIGS. 1 and 2 it results from the displacement of the scale part, extensive possiblilities of adjustment are afforded by the embodiment in accordance with FIGS. 4 and 5, as well as with the other examples explained above, i.e., one each independent adjustment of the scale part and one each adjustment of each of the stop abutments 37, 38 or 43.

Figure 4:
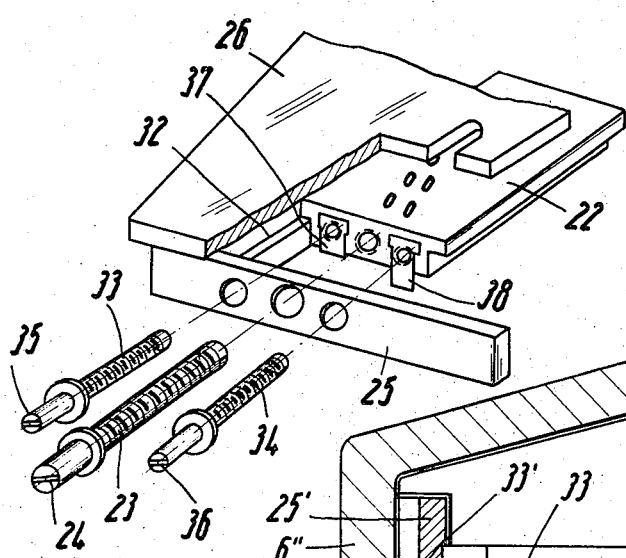
FIG. 4 is a partial view of a further embodiment of the invention in perspective and partly exploded.
Figure 5:
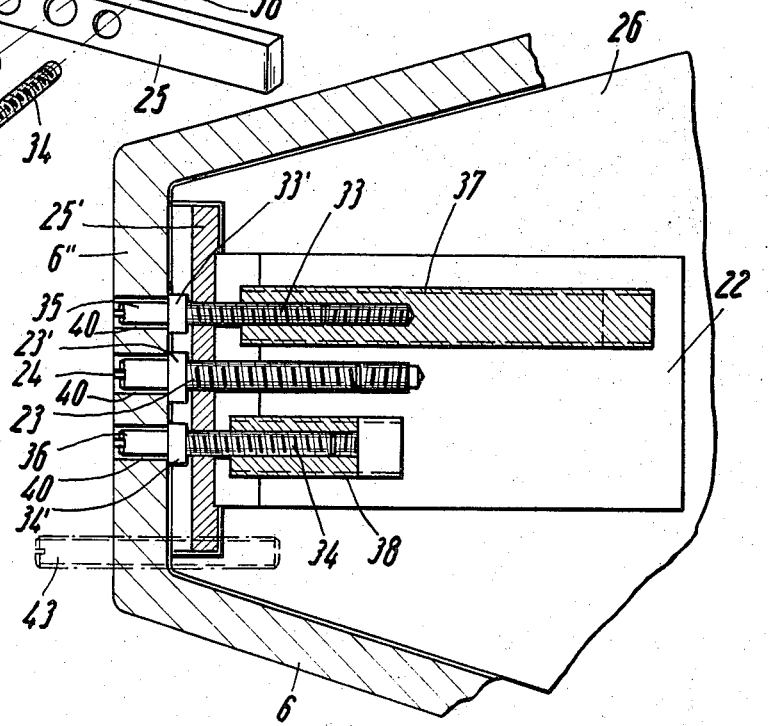
FIG. 5 shows the embodiment of FIG. 4 in a partial section analogous to the line B—B in the example of FIG. 1.

In the embodiment according to FIGS. 4 and 5 adjusting screws 33, 34 are provided which are rotatable by means of a metal sheet 25' and their collars 33', 34' but are held not slidable on the housing wall 6''. Their set slots 35, 36 are likewise accessible from the outside. The screws 33, 34 engage an inner thread of sliding supports 37, 38 while the support 37 carries or forms the rear stop abutment and the support 38 the forward stop abutment. The supports 37, 38 are each disposed in guide means of the transparent member 22 for displacement in the direction of adjustment.

For the simplification of assembly, the cover 26 can be built as a unit with the displaceable abutments, the displacement scale part, the associated screws and the abutment sheet metal plate 25', while the housing 6 and its parts are built separately. The mounting is effected by sliding the ends of the screws 24, 35 and 36 into the bores 40 of the housing. After that merely the mounting screw 29 (FIG. 1) needs to be tightened.

The manner of operation is as follows:

By adjusting the screw 20 the spring 7 is tensioned or released and the indicating edge 21 assumes a corresponding position relative to a scale 30, 31 which may be disposed either entirely on the transparent member 22 or partly thereon, partly on the border or edge 41 of the housing aperture 42. If the value that can be read on the scale does not correspond to the true force to which spring 7 is set, which can be determined by measurement, for example a key that measures moments of rotation, then this deviation can be corrected by displacing the transparent member 22 by means of screw 23. Such faults can result, for example, from inaccuracies of manufacture (including faults in the production of the scale on member 22 and of the housing or cover receiving it) or fatigue phenomena in the spring 7. In accordance with FIG. 3 coarse scale 31 is provided on the edge 41 of the aperture. Each coarse value "15" to "40" is associated with an area of fine adjustments which here is marked by circles 30 and is placed in the transparent member 22, for example by etching. In this embodiment the fine scale 30 is suitably adjusted by means of screw 23. Preferably, however, the coarse and the fine scale are provided in the transparent member 22. By utilizing one window as scale part, the scale can be mounted on the window surface cleanly and for retaining accurate measurements. A window of this type can be rapidly exchanged, for example, against a window having a different scale setting. It may readily be so long that all areas that may be in question can be encompassed.

By means of the displacement of the abutments 27, 28, or the abutments of the supports 37 and 38, or of the set screw 43 in the direction of adjustment, one can increase or decrease simultaneously the entire adjustment range, i.e., the maximum possible path of the threaded collar 8, 8'. Furthermore, one can thereby also displace the setting range completely to higher or lower forces.

Thus, it can be visioned that for a front cheek of a ski binding heretofore an adjustment range of 20–60 kg. spring release force was prescribed and that thereafter as a result of newer teachings an adjustment range of only 15–35 kg. spring release force is recommended. This is readily possible in accordance with the invention by suitable displacement of the stop abutment to the left (as seen in FIG. 1). A displacing of the entire setting range upwardly or downwardly may be required when the binding has to be changed over for possible use by a heavier or lighter person because in that event the required maximum and minimum adjustments are displaced together upwardly or downwardly.

Preferably the slots 24, 35 36 of the screws 23, 33, 34 are located alongside one another (see particularly FIGS. 4 and 5). However, an arrangement would also be possible in accordance with which one or several adjustment slots are accessible from a different side of the equipment. Thus, the setting screw 33 for the carrier and stop abutment 37 can be arranged oppositely so that its screw head with setting slot projects from the rearward wall 6' of the housing, or is accessible from there (not illustrated).

Having now described my invention with reference to the embodiments illustrated, what I desire to protect by letters patent is set forth in the appended claims.

1. Indicating device for sport equipments operating against the effect of an adjustable spring or for associated equipments that measure the force of the spring, comprising a housing having an aperture at the top, an indicator below said aperture, a transparent member provided with markings defining a scale, spring adjusting means including a set screw movably supporting said indicator proximate the scale, the set position of which can be read on said scale, a spring in said housing and first and second retaining means supporting said spring at opposite ends, spring adjusting means at one end of said spring supporting said indicator, said scale being disposed proximate said first retaining means, said indicator and said spring adjusting means, scale setting means operable to displace said scale in the direction of adjustment of said spring, said setting means and said spring adjusting means each including an adjusting screw accessible from the exterior of said housing, and stop abutments at the opposite ends of said scale cooperating with said indicator for limiting the extreme adjustable positions of said spring.

2. Indicating device in accordance with claim 1, where said housing has a cover defining a separate housing part, said scale, said stop abutments and the associated adjusting means being disposed in said separate housing part, said cover being releasably secured to a part of said housing enclosing said spring and said adjusting screw for said spring.

3. Indicating device in accordance with claim 1, where said scale is in the form of a window that is slidably disposed in the wall of said housing.

4. Indicating device in accordance with claim 3, where said adjusting screw for said scale is supported rotatably and secured against axial movement in the wall of said housing and is in threaded engagement with said scale.

5. Indicating device in accordance with claim 1 where said housing has an abutment proximate the free end of said scale and a space is defined between said abutment and said free end of said scale, said space being shorter than the threaded portion of said threaded shaft.

6. indicating device in accordance with claim 5, where said stop abutments are fixed with respect to said scale and movable therewith relative to the adjusting range of said spring.

7. Indicating device in accordance with claim 5, comprising a stop abutment on said scale and a stop abutment on the wall of said housing adjustable in the direction of spring adjustment.

8. Indicating device in accordance with claim 7, including a latching portion supported on said spring adjusting screw, such as said movable collar disposed between the stop abutments of said scale.

* * * * *